Jan. 20, 1953          H. G. BECK          2,625,715
FLEXIBLE TOGGLE SEAL
Filed Oct. 6, 1949          3 Sheets-Sheet 1
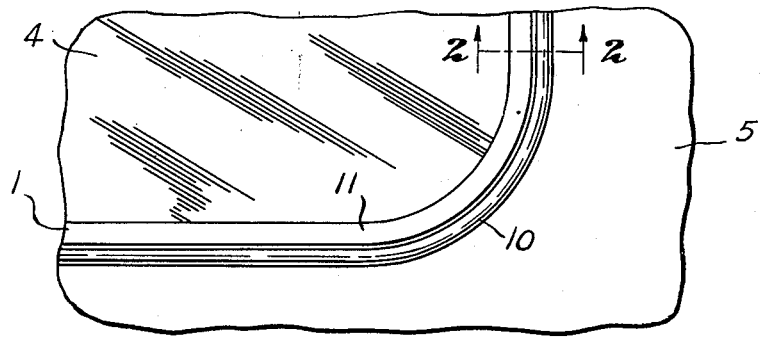
Fig. 1
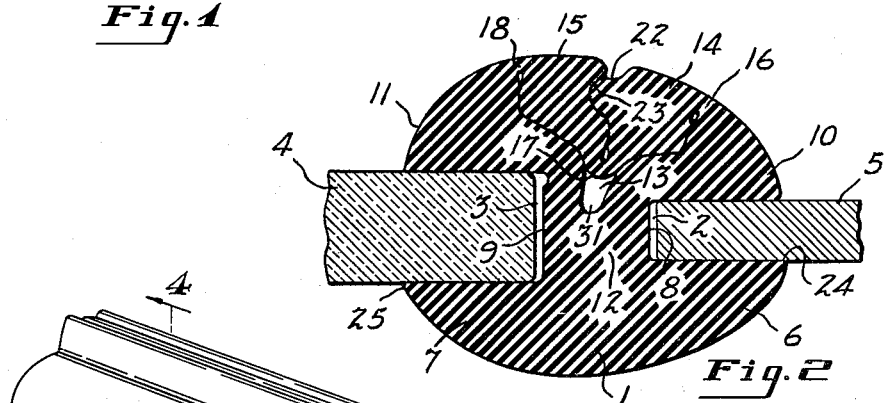
Fig. 2
Fig. 3
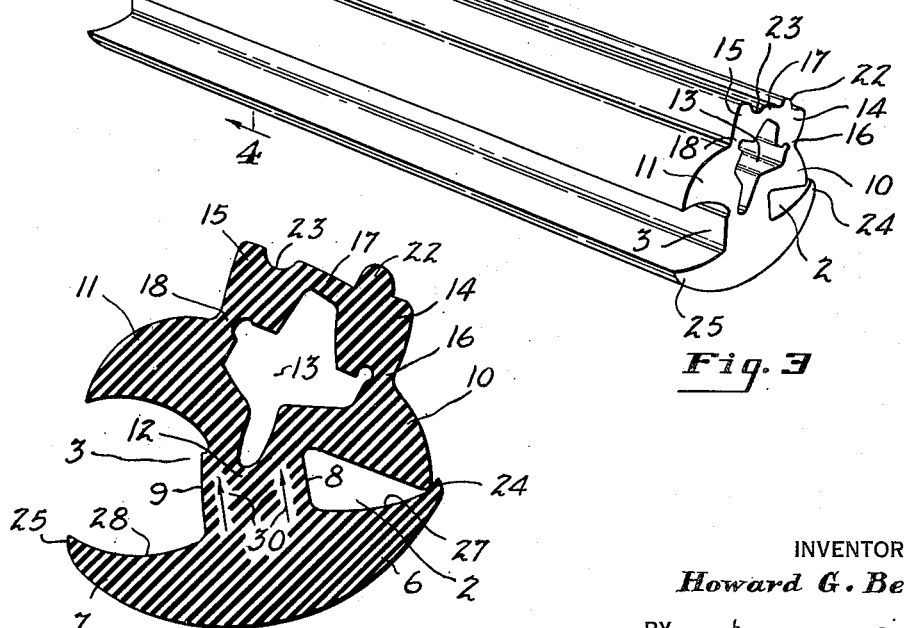
Fig. 4
INVENTOR
Howard G. Beck
BY Evans & McCoy
ATTORNEYS Jan. 20, 1953     H. G. BECK     2,625,715
FLEXIBLE TOGGLE SEAL
Filed Oct. 6, 1949     3 Sheets-Sheet 2

INVENTOR
Howard G. Beck
BY Evans & McCoy
ATTORNEYS

Jan. 20, 1953
H. G. BECK
2,625,715
FLEXIBLE TOGGLE SEAL
Filed Oct. 6, 1949
3 Sheets-Sheet 3
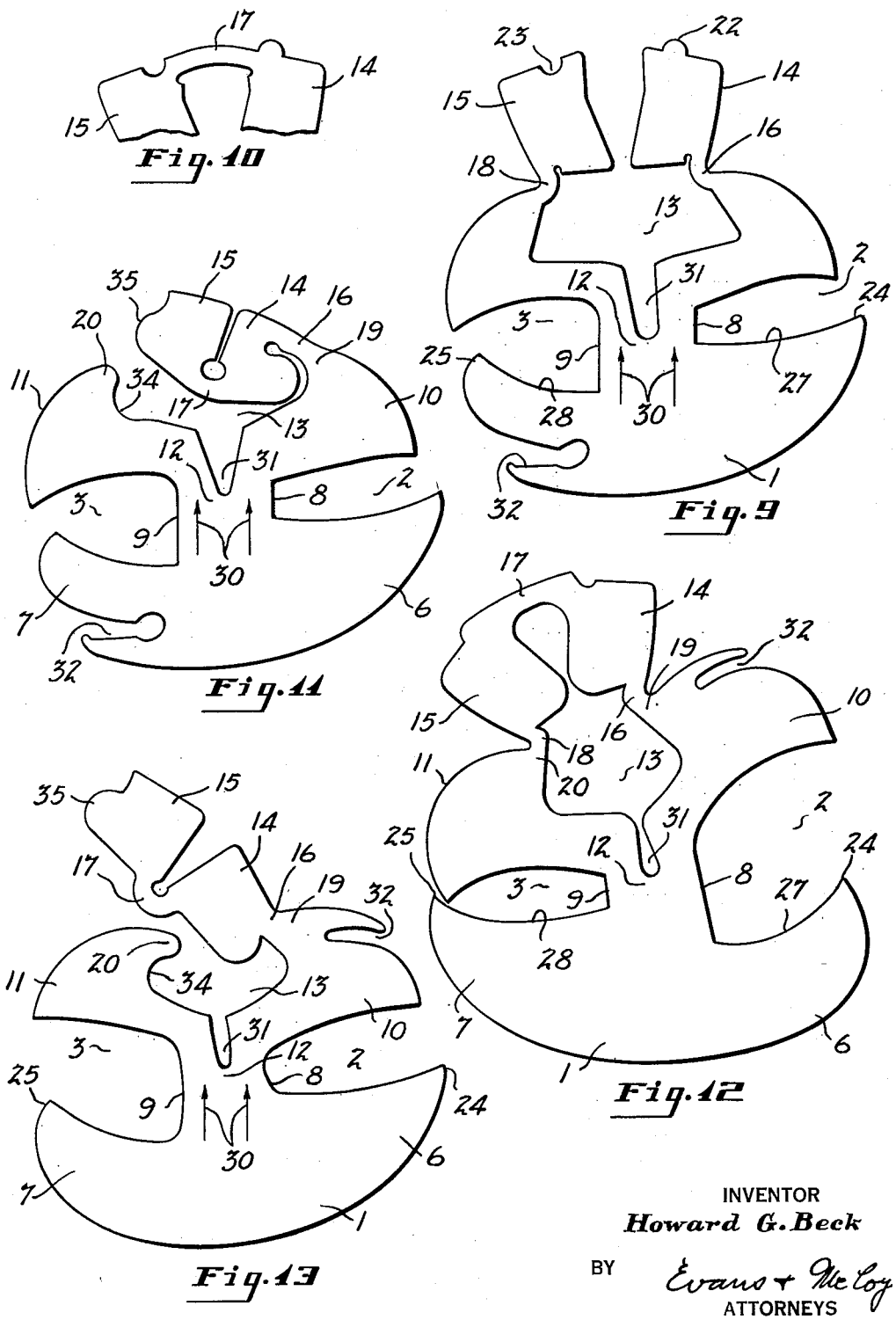
INVENTOR
*Howard G. Beck*
BY *Evans + McCoy*
ATTORNEYS Patented Jan. 20, 1953

2,625,715

UNITED STATES PATENT OFFICE 2,625,715

FLEXIBLE TOGGLE SEAL

Howard G. Beck, Wabash, Ind., assignor to The General Tire and Rubber Company, Akron, Ohio, a corporation of Ohio Application October 6, 1949, Serial No. 119,852

8 Claims. (Cl. 20—56.4)

This invention relates to improvements in seals suitable for waterproofing, sealing and glazing two panels together, and in particular to seals intended for use in connection with glazing panels, such as windshields and the like on motor vehicles.

It is an object of the present invention to provide a flexible seal which will hold edges of adjacent panel members relatively strongly in a leakproof manner and which may be assembled with comparative ease and without requiring special equipment.

It is another object of the present invention to provide a method of incorporating window glass into openings in panels, whereby the window glass is strongly and resiliently held in said openings and may be assembled therein with ease as compared to methods heretofore used.

It has often been proposed to seal edges of panellike members, such as edges of stationary windows and body portions of motor vehicles, together by a resilient sealing member having grooves for receiving the panels in opposite sides thereof, having the edges of the panels compressed in the grooves by a separately formed filler or wedging strip of hard or soft rubber, or metal inserted into a groove or recess in the body of the sealing strip. Difficulty has been experienced in the assembly of the filler strip or wedging strip into the groove in the body of the sealing strip when close quarters are involved. This is particularly the case in motor vehicle windows when an attempt is made to locate the filler strip on the inside of the vehicle so that the windows cannot be easily removed from the outside of the vehicle.

It is still another object of the present invention to provide a packing or seal to join the edges of two panellike members together, which may be readily assembled in close quarters without any special tool being required and which locks the edges of the panel members securely together.

It is a still further object of the present invention to provide such a seal which may be formed around curves and which has a locking and pressure device that is integral with the remainder of the seal.

Other objects will be apparent from the following description of the invention as illustrated by the accompanying drawings, in which:

Figure 1 is a plan view of a portion of two panels, such as a glass windshield panel, and a metal panel such for example as a body panel of a motor vehicle, joined together by a portion of a seal embodying the present invention;

Fig. 2 is a sectional view on the line 2—2 of Figure 1, showing the edge portions of the panel held together by a seal of the present invention;

Fig. 3 is a perspective view of a portion of a seal embodying the present invention in the position it occupies prior to incorporation of the edge portion of the panels within the groove and prior to the deflection of the togglelike locking device to the locked position as shown in Fig. 2;

Fig. 4 is a sectional view on the line 4—4 of Fig. 3;

Figure 6:
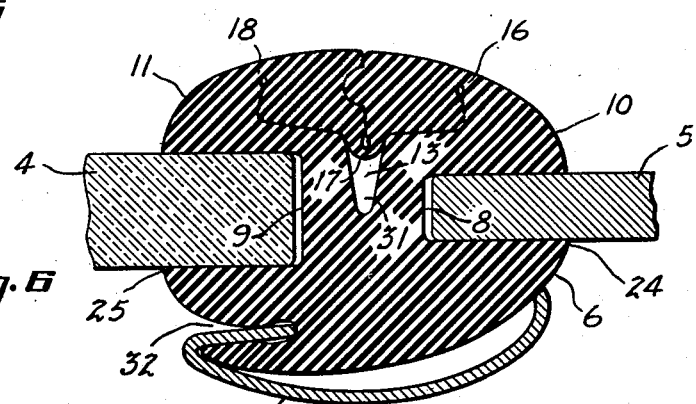
Fig. 6 is a cross sectional view similar to that of Fig. 2 of a slightly modified form of connecting seal showing the seal in locked or closed positions with portions of the edges of the panel member therein, and also showing a metal trim strip carried by an auxiliary groove.
Figures 7, 8:
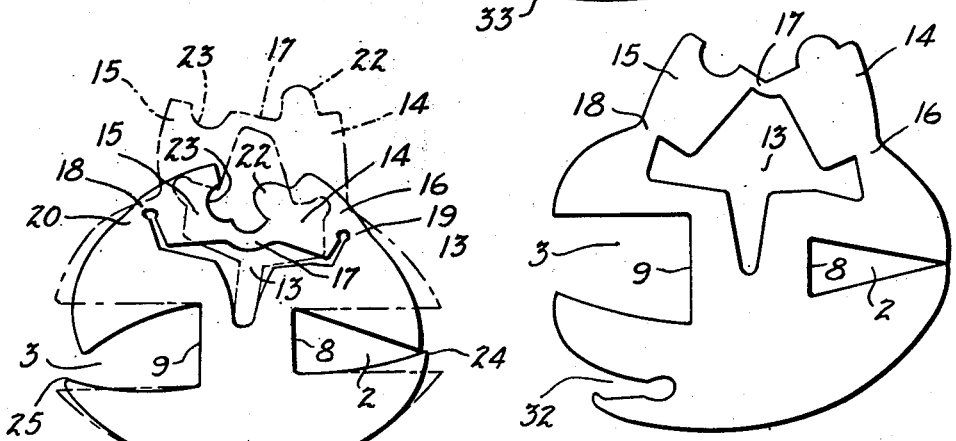

Fig. 7 is an end view of the seal shown in Fig. 6 when it is in its naturally extruded or molded and vulcanized state, and before it is locked as shown in Fig. 6; and Fig. 8 is an end view of still another modified form of seal embodying the present invention, showing in dotted lines the manner in which the seal may be opened to receive the edge portions of the panel to be joined, the solid line showing substantially the shape of the seal in its natural, molded and vulcanized state;

Fig. 9 is an end view of still another modified form of seal embodying the present invention;

Fig. 10 is an end view of a portion of a linear seal, particularly the portion of the toggle members that may be used in place of the toggle members of the seal of Fig. 9; and Figs. 11, 12 and 13 are end views of still other modified forms of linear toggle seals embodying the present invention.

Referring more particularly to the drawings, wherein like parts are indicated by like numerals of reference throughout the several views, it is seen that the linear flexible seals of the present invention exert the strong locking pressure and sealing pressure obtained by the toggle linkage on side edges of panels to be joined. They have substantially uniform cross section and hence may be formed by extrusion.

A tight and effective seal with the edge portions of panels 4 and 5, which panels are here shown as being of glass and steel, is accomplished by four integrally connected sealing flanges 6, 7, 10 and 11, respectively connected by a connecting portion 12 in the general shape of an H or I section to provide oppositely disposed panel edge-receiving grooves 2 and 3. Thus, the flanges 6 and 7 are disposed on one side of a plane or line connecting the central portions 8 and 9 of the respective panel-receiving grooves 2 and 3. Flanges 10 and 11 are disposed on the other side of this plane or line so that a side edge of each of said flanges cooperates with said side edge of another flange on the other side of said plane or line in forming opposite walls of one of the panel-receiving grooves 2 and 3. The flange portions 6 and 7 on one side of the median plane are movable toward each other only with the considerable difficulty encountered by compression of rubberlike material therebetween. These flanges (disposed on the one side of the plane joining the middle of the base of the panel edge-receiving grooves) therefore tend to resist movements relative to each other, tending to open the panel edge-receiving grooves 2 and 3 a wider extent. Flanges 10 and 11 on the opposite sides of the panel (i. e. disposed on the other side of said plane) are movable relatively freely toward each other to open the panel edge-receiving grooves 2 and 3 to a greater extent when the seals are in the unlocked position as shown in Figures 3, 4, 7, and 9 to 13, inclusive. This movement is obtained by providing an opening or hollow 13 free of rubbery material between the flange portions 10 and 11, so that they may be moved toward each other with the seal in the unlocked state, without compressing the resilient rubbery material therebetween.

In accordance with the present invention, toggle means having elements thereof at least connected to one of said relatively easily movable flange portions 10 and 11, or preferably to one or both of the sides of the opening or hollow 13, is provided to move said relatively movable flange portions toward and away from each other or to force said movable flange portions away from each other to constrict the panel edge-receiving grooves when the toggle members are disposed in locked position, as shown in Figs. 2 and 6.

The toggle means comprises toggle members 14 and 15 which are of flexible rubberlike material and are proportioned thickness to width to be stable transversely against bending and folding when pressure is applied by the toggle action. The toggle members 14 and 15 and the body portion are hingedly connected by at least two of the three flexible hinges 16, 17 and 18 and preferably by all three of these flexible hinges. The hinges 16 and 18 are each disposed between a side edge of the opening or central hollow 13 and one of the toggle elements 14 or 15, so that the toggle element 14 is hingedly or bendably connected to an outer lip portion 19 of the hollow 13, which lip portion is carried by the flange portion 10. Similarly, hinge 18 is disposed at an opposite outer edge or lip portion 20 of the hollow 13 to rigidly connect the toggle element 15 with the flange portion 11 of the body of the seal. The hinge 17 of flexible or bendable rubberlike material is disposed between the portions of the toggle members 14 and 15 to directly connect these members together. The edges of the members 14 and 15 connected by the hinge 17 are those farthest removed from integral connection with the body of the seal when the seal is in the unlocked state. One of the toggle members, 14, may be provided with a longitudinal bead 22 and the coacting toggle member 15 may be provided with a longitudinal groove 23 to receive the bead 22 of the other toggle member. The groove and the bead provide a central pivot point that is especially desirable in any case where the hinge 17 is omitted or is of insufficient strength to position the toggle members 14 and 15 relative to each other.

The toggle members 14 and 15 are dimensioned in proportion relative to the dimensions of the hollow or opening 13 so that the toggle members may be together hinged and pressed or snapped into the opening or hollow 13 to cause the flange portions 10 and 11 to be moved apart so that they exert strong sealing pressure against the portions 4 and 5 of suitable panels disposed within the panel edge-receiving grooves 2 and 3. The strong lateral reactive pressure exerted by the flange portions 10 and 11 on the toggle elements retains them in the locked positions shown in Figures 2 and 6. The pressure tending to separate the flanges 10 and 11 and exerted by the toggle members 14 and 15 when in locked position causes tension in the connecting portion 12 of the body of the seal that connects the flange portions 6 and 7 disposed on the one side of the longitudinal plane connecting the midportions of the panel edge-receiving grooves 2 and 3 with the flange portions on the other side of said plane. Such tension in the connecting portion 12 pulls the flange portions 6 and 7 strongly against the edges of the edge portions of panels 5 and 4 within the grooves 2 and 3.

The sides of the flanges 6 and 7 forming one side of the grooves 2 and 3 are preferably vulcanized or cured in a shape such that the side edges of the grooves converge. The sealing edge portions 24 and 25 of the portions of the flanges 6 and 7, i. e. the longitudinal sealing edges disposed on one side of the longitudinal plane joining the midpoints 8 and 9 of the panel edge-receiving grooves 2 and 3, are turned up toward respective flanges 10 and 11, edges forming the opposite sides of the grooves. Preferably, the side edges 27 and 28 of the flanges 6 and 7 are concavely curved, as shown in Figs. 3 and 4. When tension is applied in the direction indicated by the arrows 30 by means of the toggle elements being pushed and locked into the groove 13, as shown by Figs. 2, 5 and 7, the rubbery material of flange portions 6 and 7 is compressed and the reaction exerts strong sealing pressure against the panel edges in grooves 2 and 3.

Figure 5:
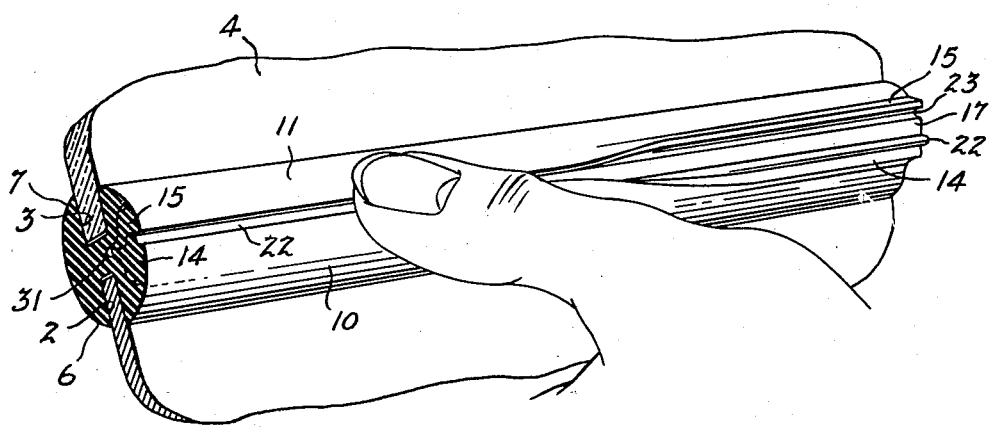
Fig. 5 is a perspective view showing the way in which the seal may be deformed into locking position to lock the side edges of two panels together.

In joining panel edges in accordance with the present invention, as shown in Fig. 5 one incorporates the edge portions of the panels 4 and 5 within the grooves 2 and 3 while the toggle elements 14 and 15 are in the unlocked position, as shown in Figs. 3, 4 and 7. One end portion of the toggle members may then be pressed into the space 13 by any suitable instrument or by one's hands, as shown in Fig. 5. Once one portion of the toggle elements has been snapped into the toggle-receiving hollow 13, the additional portions may be forced into the hollow with slight hand pressure. By sliding and pressing in the direction of the arrow 30, an entire seal may be rapidly made around the periphery of a window 4.

Because of the ease of assembly of the toggle elements into the toggle-receiving opening, the seals of the present invention are exceptionally well-adapted to the sealing of panels in relatively inaccessible locations where a sealing tool cannot be used. This permits the seals of the present invention to be disposed in such a manner that the toggle elements are on the inside of a motor vehicle and away from locations where they can be conveniently tampered with.

While I prefer to mold or vulcanize and form the seals of the present invention with the toggle members 14 and 15 outside of the toggle-receiving hollow 13, the seals of the present invention may also be formed or vulcanized as shown in the solid lines of Fig. 8. In the modification of Fig. 8 the elements 14 and 15 are within the toggle-receiving groove 13 when in their normal and unstressed state. Upon incorporating the panel edges within the panel edge-receiving grooves 2 and 3, the toggle elements are moved outwardly as shown by the dotted lines. They are then returned to the position within the toggle-receiving hollow 13 to form a locked seal similar to that shown in Figs. 2 and 6. In order to provide the desired flexibility of the flanges 10 and 12 during assembly, it is preferable that a lower portion 31 of the toggle-receiving hollow extend into the connecting portion 12 and even between the bases of the grooves 2 and 3.

In accordance with the modification of my invention shown in Figs. 6, 7 and 9 to 13, a third groove 32 is preferably generally about parallel to one of the panel edge-receiving grooves and disposed in one of the flange portions, such for example as the flange portion 7 to receive a trim or decorative strip, such as a trim strip 33 (Fig. 6). In the modification of Fig. 9, the toggle members 14 and 15 and the body 1 of the seal are connected together through only two hinges 19 and 20. The hinge 17 between the toggle members 14 and 15 is eliminated. The central pivot between toggle members is determined by the bead 22 and coacting groove 23. Otherwise, this seal is substantially the same as that previously shown.

The modification shown in Fig. 10 is identical with that of Fig. 9 except that a hinge 17 is disposed between toggle members 14 and 15.

The modification of Fig. 12 is similar to that of Fig. 4 except that it is provided with the groove 32 located on the same side of the plane joining the midpoints of the grooves 8 and 9 as is the hollow 13, so that the trim strip 33 when applied covers the toggle members 14 and 15.

In the modifications of Figs. 11 and 13, the toggle members and the body 1 are connected together only by two hinges, 16 and 17, and the lips 19 and 20 are markedly pronounced to provide an underlying or groove portion 34. It may coact with a protruding or bead portion 35 of a toggle member 15 to permit formation of a hingeless pivot between the member 15 and the flange 11 when the member 15 is first incorporated into the toggle-receiving opening 13. The pivot thus formed coacting with the pivots 16 and 17 permits the remainder of the toggle member to be snapped into place to compress the side edges of grooves 2 and 3.

It will be seen from the above that the seals of the present invention all make use of the tremendous sealing pressure easily obtainable through the use of the well-known toggle linkage. Because of the efficiency of the toggle linkage in obtaining high pressure tending to spread the flanges 10 and 11 against the surface of panels within the grooves 2 and 3, and the resultant tension applied to the connecting portions 12 of the seal, very high sealing pressure is obtained against both surfaces of the edge portions of the panel when in the grooves 2 and 3, with the result that they are securely locked in place with a fluid-tight seal. Because of the ease of obtaining this pressure, the assembly may be made without the use of instruments of any kind. Hence, the assembly may be made in areas of insufficient volume to permit the use of instruments necessary with seals before proposed.

Although the invention may be employed in various ways, only preferred embodiments have been illustrated and described. Other embodiments may be made within the invention as provided by the patent statutes.

Certain species of the subject invention are generically claimed in application Serial No. 138,671 filed January 14, 1950 by applicant and assigned to the same assignee as the assignee of the subject application.

What I claim is:

1. A flexible linear seal of rubberlike material for joining adjacent edges of rigid panellike structures together, said seal having a body portion of uniform cross section with two spaced and generally opposite linear grooves therein, a hollow in said body between said grooves and toggle joint means comprising two interfitting toggle joint elements stable against transverse folding, each of said toggle joint elements being connected to opposite sides of said hollow, said toggle joint elements and said hollow being proportioned so that said toggle joint elements can both be pressed together and sprung into said hollow to thereby compress portions of the body of the seal around edge portions of panels in said grooves to hold said edge portions firmly therein and to cause said toggle joint elements to be held and locked in said hollow by resulting pressure exerted from the body of the seal pressing upon them.

2. A flexible linear seal of rubberlike material for joining adjacent edges of rigid panellike structures together, said seal having a body portion of uniform cross section with two spaced and generally opposite linear grooves therein, a hollow in said body between said grooves and a toggle joint comprising two interfitting sections of flexible rubberlike material pivotal together, said sections being of sufficient thickness to be transversely resistant to bending and folding, said body and said sections being inter-connected by at least two hinges, said sections and said hollow being proportioned so that said sections can both be pressed together and sprung into said hollow to thereby compress portions of the body of the seal around edge portions of panels in said grooves to hold said edge portions firmly therein and to cause said sections to be held and locked in said hollow by resulting pressure exerted from the body of the seal pressing upon them.

3. A flexible linear seal of rubberlike material for joining two panel edges together, said seal having a body of uniform cross section with two spaced grooves disposed therein, and a longitudinal opening in said body portion between two of said grooves and disposed generally on one side of a longitudinal plane passing through the midpoints of the base of said grooves and flexible toggle joint means comprising two interfitting approximately equal sections, one section having a lengthwise raised bead along the interfitting face of said section and the other section having a lengthwise groove along the interfitting face of said section to receive said raised bead on the face of the first section, said toggle joint means and said body being interconnected by at least two hinges, said opening and said toggle joint elements being proportioned so that said opening tightly receives said toggle joint elements when the side walls of said panel edge-receiving grooves are spaced sufficiently to receive suitable panel edges, whereby the rubberlike material of said body closely adjacent the edges of the panel edge-receiving grooves is compressed against the portions of a panel in said grooves and said toggle joint elements are maintained in said opening by the body of the seal pressing upon them.

4. A linear seal made of a rubberlike material for joining panel edges, said seal having a uniform cross section with two opposing grooves shaped to receive the panel edges, a hollow intermediate the grooves, lips on each of two sides of said hollow, and a toggle joint means hingedly integral with the seal lengthwise of the two outside lips of said hollow and divided lengthwise into two interfitting sections transversely stable to bending and hinged together along the inner edge of the lengthwise division intermediate the lips of said hollow, one section having a lengthwise raised bead along the interfitting face of said section and the other section having a lengthwise groove along the interfitting face of said section to receive said raised bead on the face of the first section, said hollow and said toggle joint means being proportioned so that after the panel edges have been fitted into their respective grooves the toggle joint sections can be pressed and sprung past the dead center position of the toggle into said hollow opening, and thereby press the body of the seal around the panel edges to hold them firmly and thereby also cause the toggle joint means to be held and locked in said hollow by the body of the seal pressing upon it.

5. A flexible linear seal having an unlocked state adapted to receive edges of panels and a locked state adapted to connect edge portions of panels together, said seal having a uniform cross section throughout the length thereof and comprising a body of flexible rubberlike material and an integral toggle joint portion, said body having four linear flange portions and an intermediate connecting portion, said flange portions being connected together through said connecting portion into a generally H-type section to provide two linear panel edge-receiving grooves, one groove being on each of two opposite sides of said body, each of said grooves being formed by two of said flange portions paired together and connected through said connecting portion, two of said flange portions disposed on one side of a line joining the middle of said panel edge-receiving grooves being movable toward each other only by compression of a substantial mass of flexible rubberlike material of said body, and a toggle joint-receiving hollow between portions of two of said flange portions on the other side of said line, said integral toggle joint portion comprising linear toggle joint members of rubberlike material adapted to be snapped into said hollow when said seal is changed from the unlocked to the locked position, said hollow when the seal is in the unlocked position permitting flanges adjacent thereto to be moved relatively freely toward each other to open said panel edge-receiving grooves, said toggle joint members and at least one of said flange portions being connected by at least two hinges of flexible rubberlike material, the proportions of said linear toggle joint members, said flanges and of said hollow being such that when said toggle joint members are both disposed in said toggle joint-receiving hollow and panel edges are disposed in said grooves, said toggle joint members exert lateral pressure on the side edges of said hollow to place the rubberlike material of said connecting portion and connecting the flange portions on opposite sides of said line under tension to cause said flanges on both sides of said line to bear strongly against said panel edges.

6. A flexible linear seal having an unlocked state adapted to receive edges of panels and a locked state adapted to connect edge portions of panels together, said seal having a uniform cross section throughout the length thereof and comprising a body of flexible rubberlike material and an integral toggle joint portion, said body having four linear flange portions and an intermediate connecting portion, said flange portions being connected together through said connecting portion to provide two linear panel edge-receiving grooves, one groove being on each of two sides of said body, each of said grooves being formed by two of said flange portions paired together and connected through said connecting portion, two of said flange portions disposed on one side of a line joining the middle of said panel edge-receiving grooves being movable toward each other only by compression of a substantial mass of flexible, rubberlike material of said body, and a toggle joint portion-receiving hollow between portions of two of said flange portions on the other side of said line, said integral toggle joint portion comprising linear toggle joint members of rubberlike material adapted to be snapped into said hollow when said seal is changed from the unlocked to the locked position, said hollow when the seal is in the unlocked position permitting flanges adjacent thereto to be moved relatively freely toward each other to open said panel edge-receiving grooves, said toggle joint members and at least one of said flange portions being connected by at least two hinges of flexible rubberlike material, the proportions of said linear toggle members, said flanges and of said hollow being such that when said toggle joint members are both disposed in said toggle joint portion-receiving hollow and panel edges are disposed in said grooves, said toggle joint members exert lateral pressure on the side edges of said hollow to place the rubberlike material of said connecting portion and connecting the flange portions on opposite sides of said line under tension to cause said flanges on both sides of said line to bear strongly against said panel edges.

7. The mounting of claim 5 in which said toggle joint members are connected to the adjacent flange portions along the outer edges of the sides of the toggle joint-receiving hollow.

8. The mounting of claim 5 in which said toggle joint members are connected to the adjacent flange portions along the outer edges of the sides of the toggle joint-receiving hollow, and the toggle joint members are hinged together adjacent their inner edges.

HOWARD G. BECK.

REFERENCES CITED

The following references are of record in the file of this patent:

UNITED STATES PATENTS

| Number | Name | Date |
| --- | --- | --- |
| 1,961,352 | Hall | June 5, 1934 |
| 2,189,138 | Eichner | Feb. 6, 1940 |
| 2,350,430 | Ulrich | June 6, 1944 |
| 2,430,873 | Haas | Nov. 18, 1947 |
| 2,492,566 | Geyer | Dec. 27, 1949 |